(12) United States Patent
Ishii et al.

(10) Patent No.: US 6,382,238 B2
(45) Date of Patent: May 7, 2002

(54) FLUID CONTROL APPARATUS

(75) Inventors: Ken Ishii, Kawasaki; Tsuneyuki Okabe, Tsukui-gun; Yuji Kawano; Michio Yamaji, both of Osaka, all of (JP)

(73) Assignees: Tokyo Electron Limited, Tokyo; Fujikin Incorporated, Osaka, both of (JP)

( * ) Notice: Subject to any disclaimer, the term of this patent is extended or adjusted under 35 U.S.C. 154(b) by 0 days.

(21) Appl. No.: 09/801,896

(22) Filed: Mar. 9, 2001

(30) Foreign Application Priority Data

Mar. 10, 2000 (JP) ........................................ 2000-065981
Mar. 10, 2000 (JP) ........................................ 2000-065986

(51) Int. Cl.$^7$ ................................................. F17D 1/06
(52) U.S. Cl. ........................................ 137/271; 137/884
(58) Field of Search ................................. 137/271, 269, 137/884

(56) References Cited

U.S. PATENT DOCUMENTS 6,012,479 A * 1/2000 Fukushima et al. ......... 137/271
6,076,543 A 6/2000 Johnson
6,116,283 A * 9/2000 Yamaji et al. .......... 137/271 X

FOREIGN PATENT DOCUMENTS

| EP | 0 323 455 | 7/1989 |
|----|-----------|--------|
| EP | 0844424 | 5/1998 |
| JP | 10-141598 | 5/1998 |
| JP | 10-169881 | 6/1998 |
| JP | 10-300000 | 11/1998 |
| JP | 11051226 | 2/1999 |
| JP | 11294615 | 10/1999 |
| JP | 11-351500 | 12/1999 |
| JP | 2000-35148 | 2/2000 |
| WO | 9915818 | 4/1999 |

* cited by examiner

Primary Examiner—Kevin Lee
(74) Attorney, Agent, or Firm—Armstrong, Westerman & Hattori, LLP

(57) ABSTRACT

Lower members of each of lines A, B, C, D, E, P are mounted on a subbase panel 3 with screws, upper members 11, 12, 13, 14, 15, 16, 17, 18, 19 of each line are mounted on the lower members with screws, and the subbase panels 3 is mounted on a single main base panel 2. Channel connecting element 50 is removable upward.

12 Claims, 10 Drawing Sheets

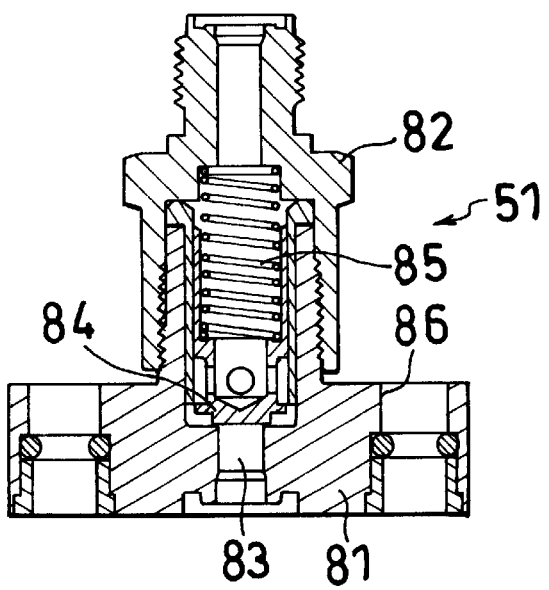
Fig.10
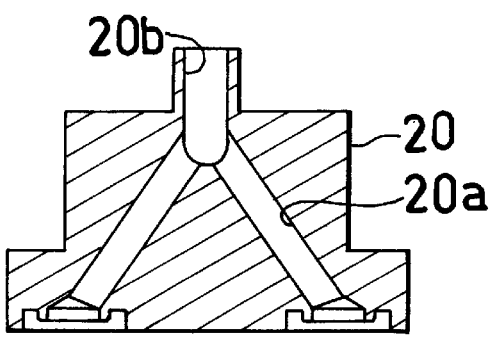
Fig.11
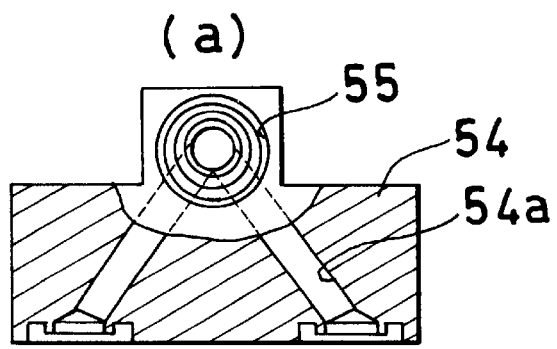
Fig.12 (a)
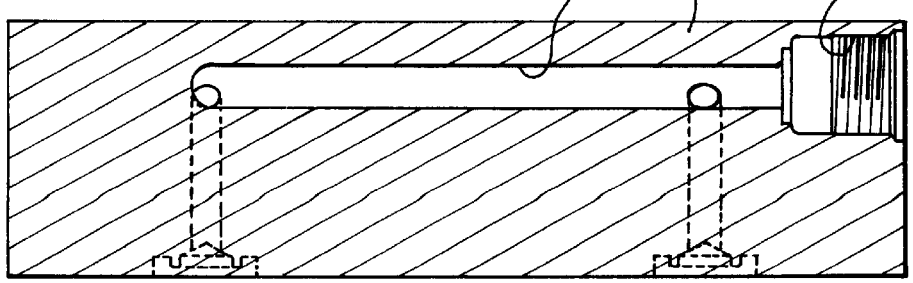
(b)

FLUID CONTROL APPARATUS

BACKGROUND OF THE INVENTION

The present invention relates to fluid control apparatus for use in semiconductor manufacturing equipment, and more particularly to integrated fluid control apparatus which are so assembled that the fluid control components thereof can be individually removed upward for maintenance or inspection.

The term "front" refers to the upper side of FIG. 1, and the term "rear" to the lower side of the same. The terms "upper" and "lower" refer respectively to the upper and lower sides of FIG. 2, and the terms "left" and "right" are used for the apparatus as it is seen from the rear forward. These terms are used for convenience sake; the apparatus may be used as reversed With respect to the longitudinal direction, as laid on its side.

Fluid control apparatus for use in semiconductor manufacturing equipment comprise a plurality of rows of various fluid control devices, and the fluid control devices of adjacent rows have their fluid channels interconnected by device connecting means at specified locations. With such fluid control apparatus, massflow controllers, on-off valves and other components are connected together for integration without using tubes in recent years (see, for example, JP-A No. 10-227368 (1998), which corresponds to U.S. application Ser. No. 09/023,416). The integrated fluid control apparatus is assembled by mounting block couplings and like lower members on a panel with screws first, then mounting each of upper members on two of the lower members, and interconnecting channels of the members of adjacent rows by channel connecting means at specified locations.

In the case of the conventional fluid control apparatus described, the individual upper members can be removed upward for inspection, repair or replacement, whereas no consideration is given to modifications such as installation of two additional rows to four existing lines.

In adding components to the conventional integrated fluid control apparatus or in modifying the construction of the apparatus, there arises a need to make additional screw holes in the panel for fixing base blocks, while specified accuracy is required of the screw holes to be thus formed in order to mount upper members, so that the conventional apparatus has the problem that difficulty is encountered in manually making the additional screw holes after the completion of the panel. Further since the upper members are connected to one another all by the lower members, branching off the existing lines or joining additional lines to the existing lines requires removal of upper members, replacement of lower members by different components and reinstallation of the upper members, hence the problem of necessitating an increased number of work steps.

Because of the above problems, it is practice to mount required devices anew on a panel and to install the assembly for replacement when there arises a need for an alteration or modification of the system, whereas this entails the cessation of operation of the apparatus for a long period of time and increased number of work steps to be performed at the site of installation.

In view of the situation, it has become important that the fluid control apparatus of the type described be adapted to readily fulfill the need to install additional lines or modify the existing lines.

SUMMARY OF THE INVENTION

An object of the present invention is to provide an integrated fluid control apparatus which is readily adapted for the installation of additional lines or modification of existing lines.

The present invention provides a fluid control apparatus comprising lines arranged in parallel and each comprising a plurality of lower members arranged in series and a plurality of upper members arranged in series, channels of members of the adjacent lines being interconnected by channel connecting means at specified locations, the fluid control apparatus being characterized in that the lower members of each of the lines are mounted on a subbase panel with screws, the upper members of each line being mounted on the lower members with screws, the subbase panels being mounted on a single main base panel, the channel connecting means being removable upward.

A line can be additionally installed in the fluid control apparatus of the invention merely by mounting the line to be added on a subbase panel, and mounting the subbase panel on the main base panel. Further one of the existing line can be altered merely by removing the oil line to be altered along with the subbase panel, mounting a new line on a subbase panel, and mounting the subbase panel on the main base panel. Thus, additional lines can be installed or the existing lines can be modified with ease. The channel connecting means are removed temporarily, followed by the installation of additional lines or alteration of the existing lines, and the channels are then connected to one another as required by the channel connecting means. In this way, additional lines can be installed or the existing lines can be modified merely by removing a minimum number of members required.

One of the upper members can be a shutoff-opening device comprising a two-port valve and a three-port valve which are arranged adjacent to each other. In this case, these two valves preferably have the following constructions. The two-port valve comprises a valve body having a first fluid inflow channel and a first fluid outflow channel, and an actuator for bringing the two channels into or out of communication with each other, and the three-port valve comprises a valve body having a first fluid inflow channel, a second fluid inflow channel and an outflow channel for use with a first fluid and a second fluid in common, and an actuator for bringing the second fluid inflow channel into or out of communication with the outflow channel, the first fluid inflow channel of the three-port valve always communicating with the outflow channel thereof via a valve chamber, the first and second fluid inflow channels of the three-port valve being opened in an abutting surface, the outflow channel of the three-port valve being opened in a lower surface, the first fluid outflow channel of the two-port valve being in communication with the first fluid inflow channel of the three-port valve, the valve body of the two-port valve being further provided with a second fluid inflow channel opened in a lower surface thereof and communicating with the second fluid inflow channel of the three-port valve.

When a second fluid (e.g., process gas) is to be passed through the fluid control apparatus having the shutoff-opening device described above, the actuator of the two-port valve is closed, while the actuator of the three-port valve is opened to hold the second fluid inflow channel in communication with the outflow channel. The second fluid is introduced into the apparatus through the second fluid inflow channel of the two-port valve. The second fluid flows through the second fluid inflow channel of the two-port valve, and the second fluid inflow channel and the outflow channel of the three-port valve to the massflow controller, etc. The actuator of the two-port valve is thereafter opened, the actuator of the three-port valve is closed to shut off the second fluid inflow channel, and a first fluid (e.g., purge gas) is introduced into the apparatus through the first fluid inflow channel of the two-port valve. The first fluid is sent to the massflow controller, etc. by way of the first fluid inflow channel and outflow channel of the two-way valve and the first fluid inflow channel and the outflow channel of the three-port valve. The first fluid drives away the second fluid remaining in the outflow channel of the three-port valve with the pressure of its own and flows toward the massflow controller to rapidly remove the mixture of the first and second fluids. The first fluid only flows through the massflow controller, etc. within a short period of time.

With the shutoff-opening device described, a blocklike coupling having a channel communicating with the second fluid inflow channel of the two-port valve is disposed under this valve, while a blocklike coupling having a channel communicating with the outflow channel of the three-port valve is disposed under this valve. The shutoff-opening device can be mounted on both these blocklike couplings to interconnect the couplings, whereby the fluid control apparatus can be integrated easily. This also renders the shutoff-opening device easy to maintain and inspect.

Preferably, the first fluid inflow channel of the two-port valve comprises an upstream portion opened in an upper surface of the valve body and extending obliquely downward from the upper surface of the valve body, and a downstream portion communicating with the upstream portion and extending upward to a valve chamber of the two-port valve, the first fluid inflow channels of the adjacent lines being connected to one another by the channel connecting means. The lines, as well as the subbase panels, can then be made to have the same width. The required line can then be positioned at a desired position or replaced by an optional line with ease.

Preferably, the main base panel has a space for installing additional lines. When desired, additional lines can then be installed in the system with extreme ease.

The channel connecting means may comprise a block coupling mounted in place with screws from above and having an I-shaped channel. The channel connecting means may comprise a manifold block coupling mounted in place with screws from above and having a lateral opening. This facilitates the work of removing the channel connecting means temporarily, then installing additional lines or modifying the existing lines, and thereafter connecting the channels to one another again by the channel connecting means as required.

BRIEF DESCRIPTION OF THE DRAWINGS

FIG. 10 is a sectional view of a block coupling;

FIG. 11 is a sectional view of an inverted V-shaped channel block; and

FIG. 12 includes sectional views of a manifold block coupling.

DESCRIPTION OF THE PREFERRED EMBODIMENTS

Embodiments of the present invention will be described below with reference to the drawings.

Figure 1:
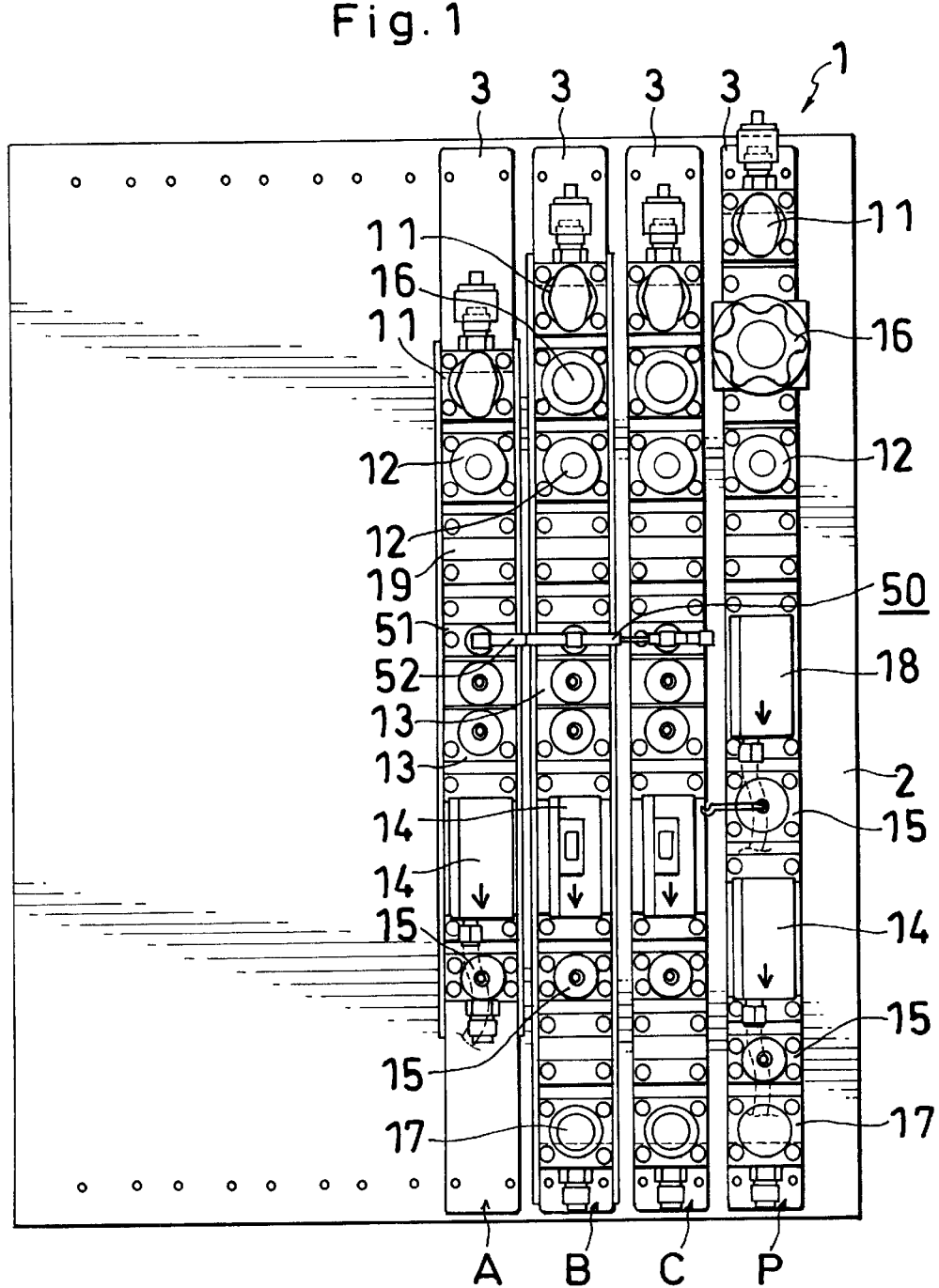
FIG. 1 is a plan view showing a first embodiment of fluid control apparatus of the invention.
Figure 2:
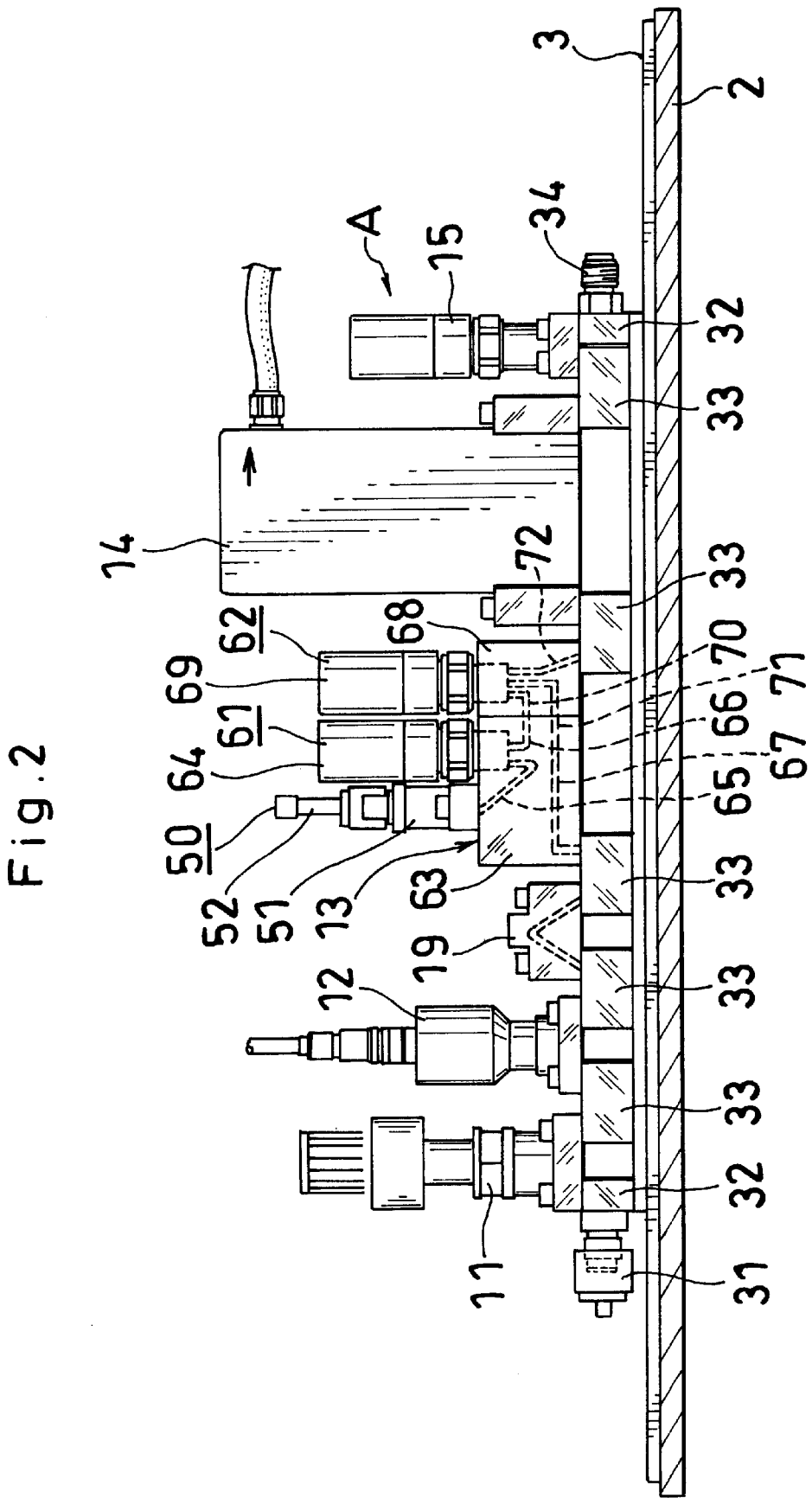
FIG. 2 is a side elevation of A line of FIG. 1.

FIGS. 1 and 2 show a first embodiment of fluid control apparatus of the invention. The apparatus 1 comprises, as arranged from the left-hand side of FIG. 1 rightward, process gas A line A, process gas B line B, process gas C line C and purge gas line P.

Each of these four lines A, B, C, P comprises fluid control devices each having a predetermined function and mounted on a slender subbase panel 3. The subbase panels (four in total number) 3 are mounted on a single main base panel 2. The left half of the main base panel 2 has a space provided with mount holes so that similar lines can be installed thereon additionally.

The process gas A line A consists mainly of a check valve 11, pressure sensor 12, shutoff-opening device 13, massflow controller 14 and on-off valve 15. The process gas B line B and the process gas C line C, which are the same in construction, consist mainly of a check valve 11, pressure regulator 16, pressure sensor 12, shutoff-opening device 13, massflow controller 14, on-off valve 15 and filter 17. The purge gas line P consists mainly of a check valve 11, pressure regulator 16, pressure sensor 12, massflow meter, on-off valve 15, massflow controller 14, on-off valve 15 and filter 17.

These lines A, B, C, P each comprise lower members 31, 32, 33, 34 mounted on the subbase panel 3 with screws, and upper members 11, 12, 13, 14, 15, 16, 17, 18, 19 mounted on the lower members 31, 32, 33, 34 with screws, the subbase panels 3 for all the line having the same size. The upper members 11, 12, 13, 14, 15, 16, 17, 18, 19 each perform the required function in the line A, B, C, or P concerned, and the lower members 31, 32, 33, 34, each have the function of connecting channels in the upper members 11, 12, 13, 14, 15, 16, 17, 18, 19. The shutoff-opening devices 13 of the process gas lines A, B, C are connected to one another by channel connecting means 50.

With reference to the process gas A line A shown in FIG. 2, arranged as upper members are the check valve 11, pressure sensor 12, inverted V-shaped channel block 19, shutoff-opening device 13, massflow controller 14 and on-off valve 15. The upper members 11, 12, 13, 14, 15, 19 each have a channel opened downward. Arranged from the left rightward as lower members are an L-shaped channel block coupling 32 connected to the check valve 11 and having an inlet coupling 31 attached thereto, V-shaped channel block coupling 33 holding the check valve 11 in communication with the pressure sensor 12, V-shaped channel block coupling 33 holding the pressure sensor 12 in communication with the inverted V-shaped channel block 19, V-shaped channel block coupling 33 holding the inverted V-shaped channel block 19 in communication with the shutoff-opening device 13, V-shaped channel block coupling 33 holding the shutoff-opening device 13 in communication with the massflow controller 14, V-shaped channel block coupling 33 holding the massflow controller 14 in communication with the on-off valve 15, and L-shaped channel block coupling 32 connected to the on-off valve 15 and having an outlet coupling 34 attached thereto.

The shutoff-opening device 13 comprises a rear two-port valve 61 and a front three-port valve 62 adjacent to each other.

The two-port valve 61 comprises a rectangular parallelepipedal valve body 63 and an actuator 64 attached thereto from above. The valve body 63 is provided with a first fluid inflow channel 65, and a first fluid outflow channel 66 which is brought into or out of communication with the channel 65 by the actuator 64, and a second fluid inflow channel 67 positioned under the two channels 65, 66. The three-port valve 62 also comprises a rectangular parallelepipedal valve body 68 and an actuator 69 attached thereto from above. The valve body 68 is provided with a first fluid inflow channel 70, a second fluid inflow channel 71, and an outflow channel 72 to be used for a first fluid and a second fluid in common and to be brought into or out of communication with the channel 71 by the actuator 69.

Figure 8:
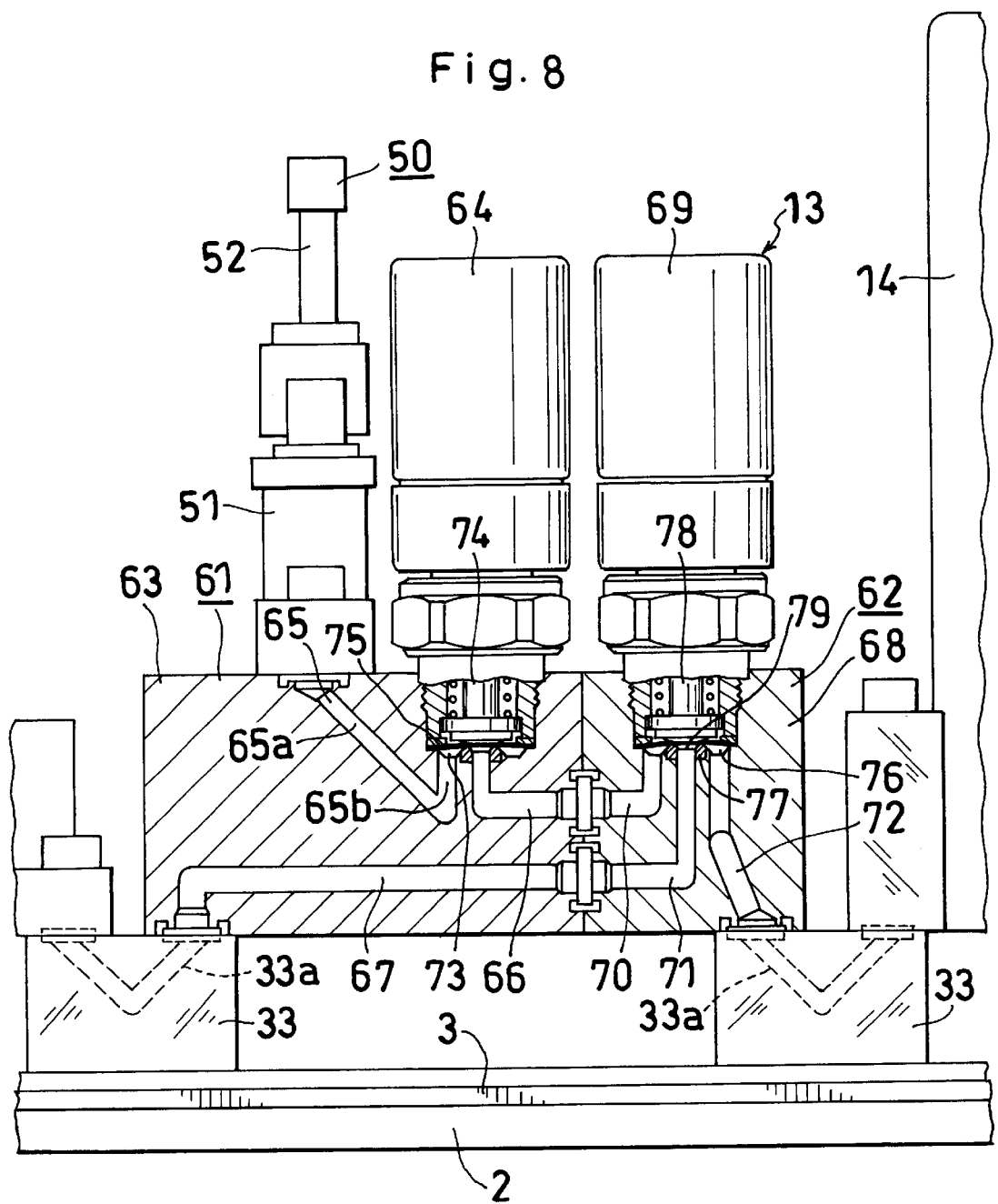
FIG. 8 is an enlarged view in section of a shutoff-opening device.
Figure 9:
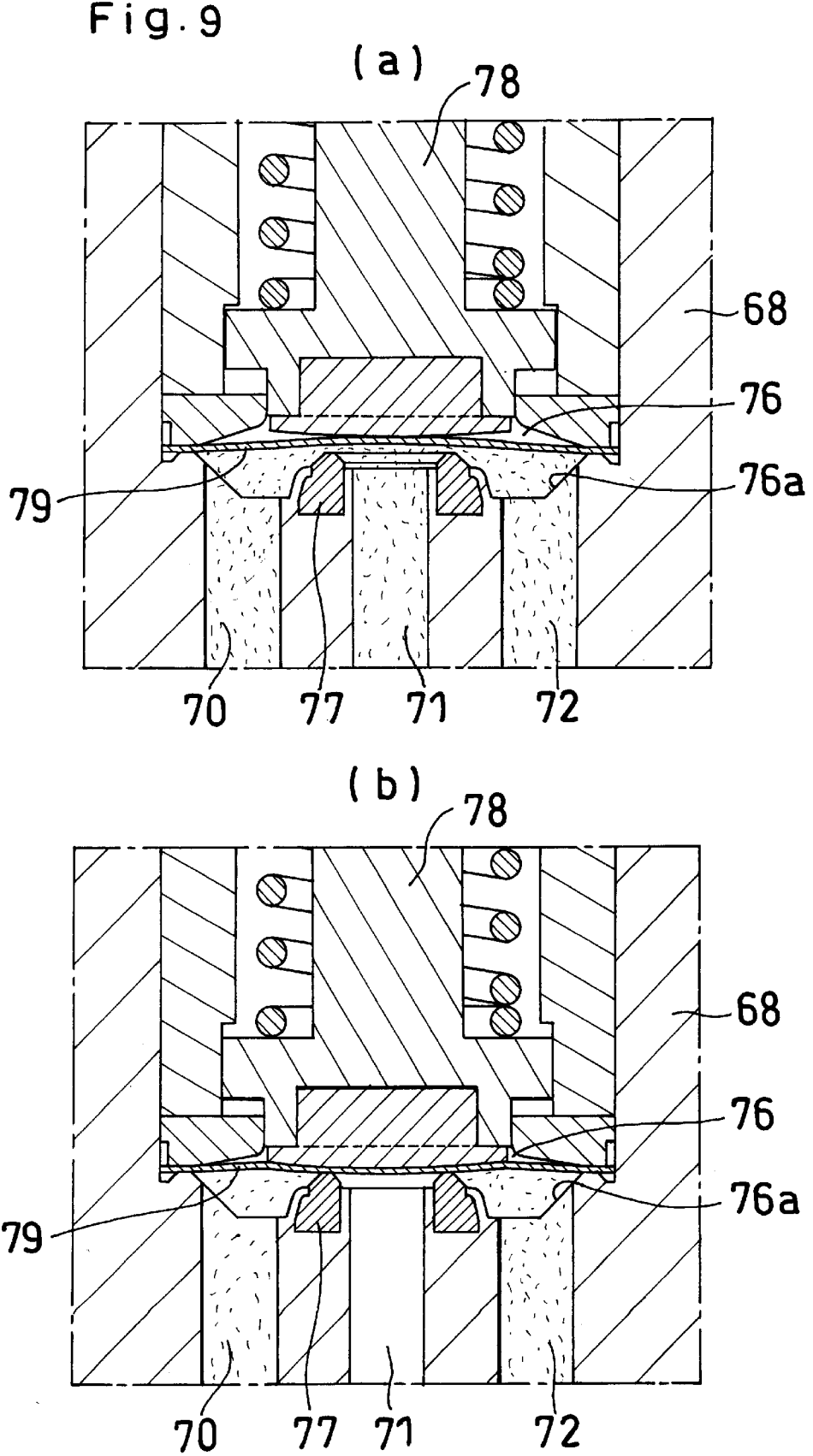
FIG. 9 includes enlarged views in section of a three-port valve.

FIG. 8 is an enlarged view of the shutoff-opening device 13, and FIG. 9 includes enlarged fragmentary views of the three-port valve 62.

With reference to FIG. 8, the valve body 63 of the two-port valve 61 has twice the front-to-rear length of the valve body 68 of the three-port valve 62, and the actuator 64 is mounted on a front portion thereof. The first fluid inflow channel 65 of the two-port valve 61 is generally V-shaped and comprises a slanting upstream portion 65a and a vertical downstream portion 65b. The upstream portion 65a has an upper end provided with an opening in the upper surface of rear portion of the valve body 63, and the downstream portion 65b has an upper end communicating with a valve chamber 73. The first fluid outflow channel 66 of the two-port valve 61 is generally L-shaped and has one end provided with an opening in the front surface of the valve body 63, and the other end communicating with the valve chamber 73. The second fluid inflow channel 67 of the two-port valve 61 is generally inverted L-shaped, and has one end provided with an opening in the lower surface of rear portion of the valve body 63 and the other end provided with an opening in the front surface of the valve body 63. The two-port valve 61 is a diaphragm valve, and has a diaphragm 75 which is moved upward and downward within the valve chamber 73 with the upward and downward movement of a valve stem 74 by the operation of the actuator 64, whereby the opening of the outflow channel 66 is shut off or opened.

The first fluid inflow channel 70 of the three-port valve 63 is generally L-shaped, and has one end provided with an opening in the rear surface of the valve body 68 and communicating with the outflow channel 66 of the two-port valve 61, and the other end communicating with a valve chamber 76. The second fluid inflow channel 71 of the three-port valve 62 is generally L-shaped and has one end provided with an opening in the rear surface of the valve body 68 below the first fluid inflow channel 70, and the other end communicating with the valve chamber 76. The outflow channel 72 of the three-port valve 62 is for use with the first and second fluids in common and has one end provided with an opening in the lower surface of the valve body 68 and the other end communicating with the valve chamber 76.

As shown on an enlarged scale in FIG. 9, the three-port valve 62 is a diaphragm valve and has an annular groove 76a in the bottom of the valve chamber 76. The upper-end opening of the first fluid inflow channel 70 communicates with a rear portion of the annular groove 76a, and the upper-end opening of the outflow channel 72 communicates with a front portion of the groove. Thus, the inflow channel 70 is always in communication with the outflow channel 72 through the annular groove 76a of the valve chamber 76. The opening of the upper end of the second fluid inflow channel 69 is defined by an annular valve seat 77 provided around the upper end. The actuator 69 is operated to move a valve stem 78 upward or downward to thereby move a diaphragm (valve element) 79 within the valve chamber 76, whereby the inflow channel 71 is opened or shut off. FIG. 9(a) shows the valve stem 78 as raised, holding the inflow channel 71 open, with the channel 71 in communication with the outflow channel 72 via the valve chamber 76. FIG. 9(b) shows the valve stem 78 as lowered, holding the channel 71 closed. Even in this case, the first fluid inflow channel 70 is in communication with the outflow channel 72.

The valve body 63 of the two-port valve 61 and the valve body 68 of the three-port valve 62 are connected together with bolts (not shown) driven in from the right. A seal is provided at each of the butt joint between the first fluid outflow channel 66 of the two-port valve 61 and the first fluid inflow channel 70 of the three-port valve 62, and the butt joint-between the second fluid inflow channel 67 of the two-port valve 61 and like channel 71 of the three-port valve 62.

Provided beneath the lower surface of rear end portion of the valve body 63 of the two-port valve 61 is a block coupling 33 having a V-shaped channel 33a for holding the opening of the second fluid inflow channel 67 in communication with a process gas introduction line. Also provided beneath the valve body 68 of the three-port valve 62 is a block coupling 33 having a V-shaped channel 33a for causing the opening of the outflow channel 72 to communicate with an inlet channel of the massflow controller 14. The shutoff-opening device 13 is attached from to both the V-shaped channel block couplings 33 with screws driven in from above. Another block coupling 33 having a V-shaped channel 33a is provided also at the outlet side of the massflow controller 14, and the massflow controller 14 is attached to both the block couplings 33 with screws driven in from above. Each block coupling 33 is mounted on the subbase panel 3 with screws driven in from above.

When the process gas is introduced into the three-port valve 62, with the two-port valve 61 closed and the valve 62 opened, the process gas has its flow rate adjusted by the massflow controller 14 and sent to a process chamber. When a purge gas is thereafter supplied to the two-port valve 61 with the valve 61 opened and the three-port valve 62 closed, the purge gas flows through the valves 61, 62 and the massflow controller 14 to thereby purge the fluid control apparatus of the process gas.

When the second fluid (i.e., process gas in this embodiment) is to be passed through the apparatus, the actuator 64 of the two-port valve 61 is closed, with the actuator 69 of the three-port valve 62 opened to hold the second fluid inflow channel 71 thereof in communication with the outflow channel 72, and the second fluid is introduced into the second fluid inflow channel 67 of the two-port valve 61, whereby the second fluid is sent to the massflow controller 14 via the second fluid inflow channel 67 of the valve 61 and the second fluid inflow channel 71 and the outflow channel 72 of the three-port valve 62. The actuator 64 of the two-port valve 61 is thereafter opened, the actuator 69 of the three-port valve 62 is closed to shut off the second fluid inflow channel 71, and the first fluid (i.e., purge gas in this embodiment) is introduced into the first fluid inflow channel 65 of the two-port valve 61. The first fluid is sent to the massflow controller 14 by way of the first fluid inflow channel 65 and outflow channel 66 of the two-port valve 61 and the first fluid inflow channel 70 and the outflow channel 72 of the three-port valve 62. The first fluid flows toward the massflow controller 14, driving away the second fluid remaining in the valve chamber 76 and the outflow channel 72 of the three-port valve 62 with its own pressure to rapidly remove the mixture of first and second fluids, with the result that the first fluid (purge gas) only flows through the apparatus within a short period of time.

The channel connecting means 50 comprises three I-shaped channel block couplings 51 and tubes 52 for interconnecting the couplings 51.

With reference to FIG. 10, the I-shaped channel block coupling 51 comprises a main body 81 T-shaped in cross section and having a downwardly open channel 83, and a tube connector 82 screwed on an externally threaded portion at the top of the main body 81. Disposed in the channel 83 inside the main body 81 is a valve element 84 biased downward by a compression coil spring 85 for closing the channel when the internal pressure is zero or opening the channel when the internal pressure is not lower than a predetermined level. The main body 81 is provided at its opposite sides with holes 86 for inserting bolts therethrough for mounting the coupling on the shutoff-opening device 13. The upward opening of the first fluid inflow channel 65 of the shutoff-opening device 13 is positioned immediately above the center axis of the line. The block couplings 51, as well as the tubes 52, are all of the same size.

Figure 3:
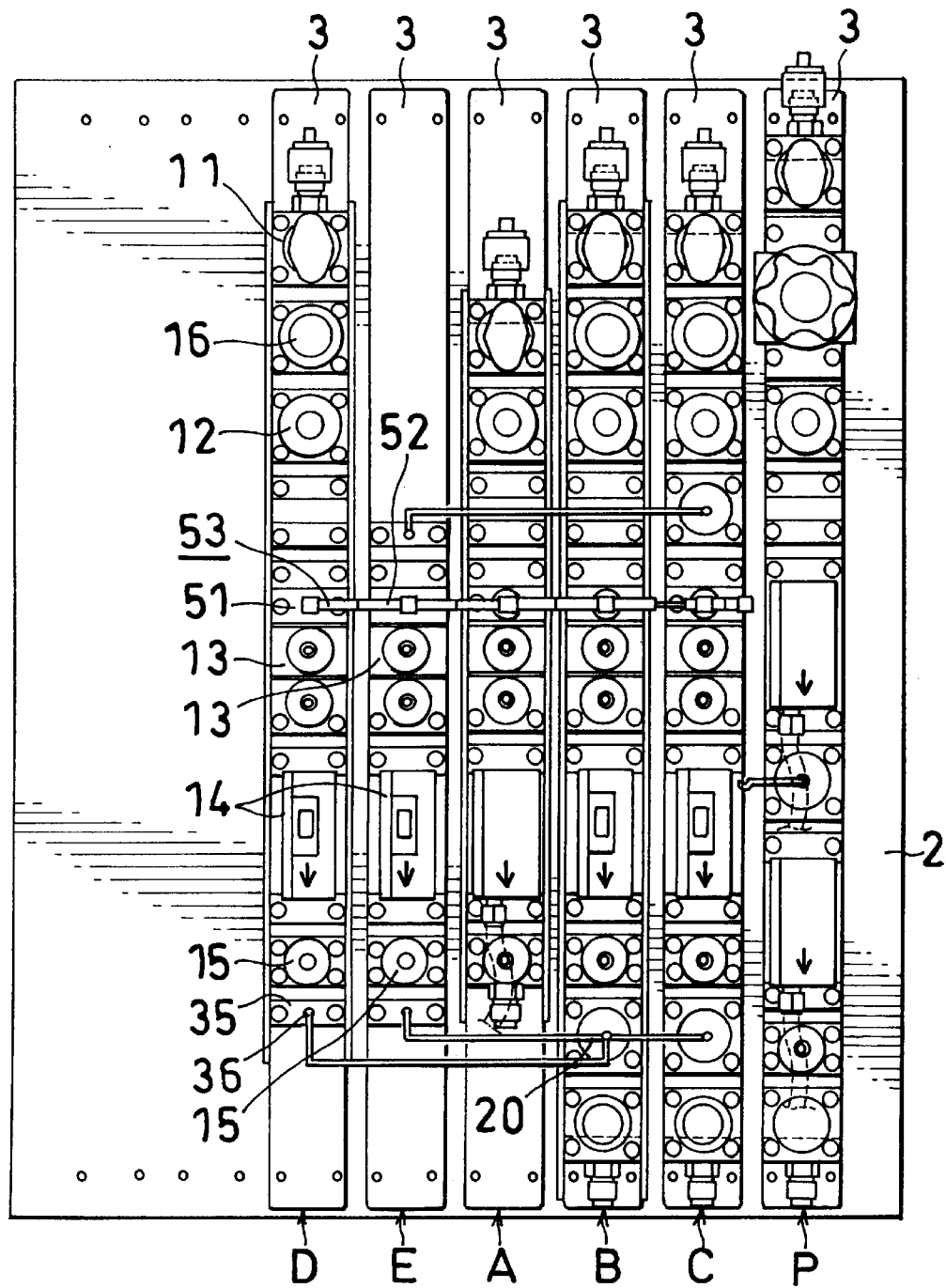
FIG. 3 is a plan view showing a second embodiment of fluid control apparatus of the invention.

FIG. 3 shows a second embodiment of fluid control apparatus of the present invention. This apparatus is obtained by installing two additional lines in the first embodiment shown in FIG. 1. With reference to FIG. 3, process gas D line D and process gas E line E are installed at the left of four lines having the same functions as the first embodiment, with some modifications made in the process gas B line B and process gas C line C.

The process gas D line D consists mainly of a check valve 11, pressure regulator 16, pressure sensor 12, shutoff-opening device 13, massflow controller 14 and on-off valve 15. The process gas E line E consists mainly of a shutoff-opening device 13, massflow controller 14 and on-off valve 15. Inverted V-shaped channel block couplings 20 provided at the outlet side of the process gas B line B and the inlet side and outlet side of the process gas C line C are so shaped as to be described later. Furthermore, channel connecting means 53 comprises five I-shaped channel block couplings 51 and tubes 52 interconnecting these block couplings 51.

Figure 4:
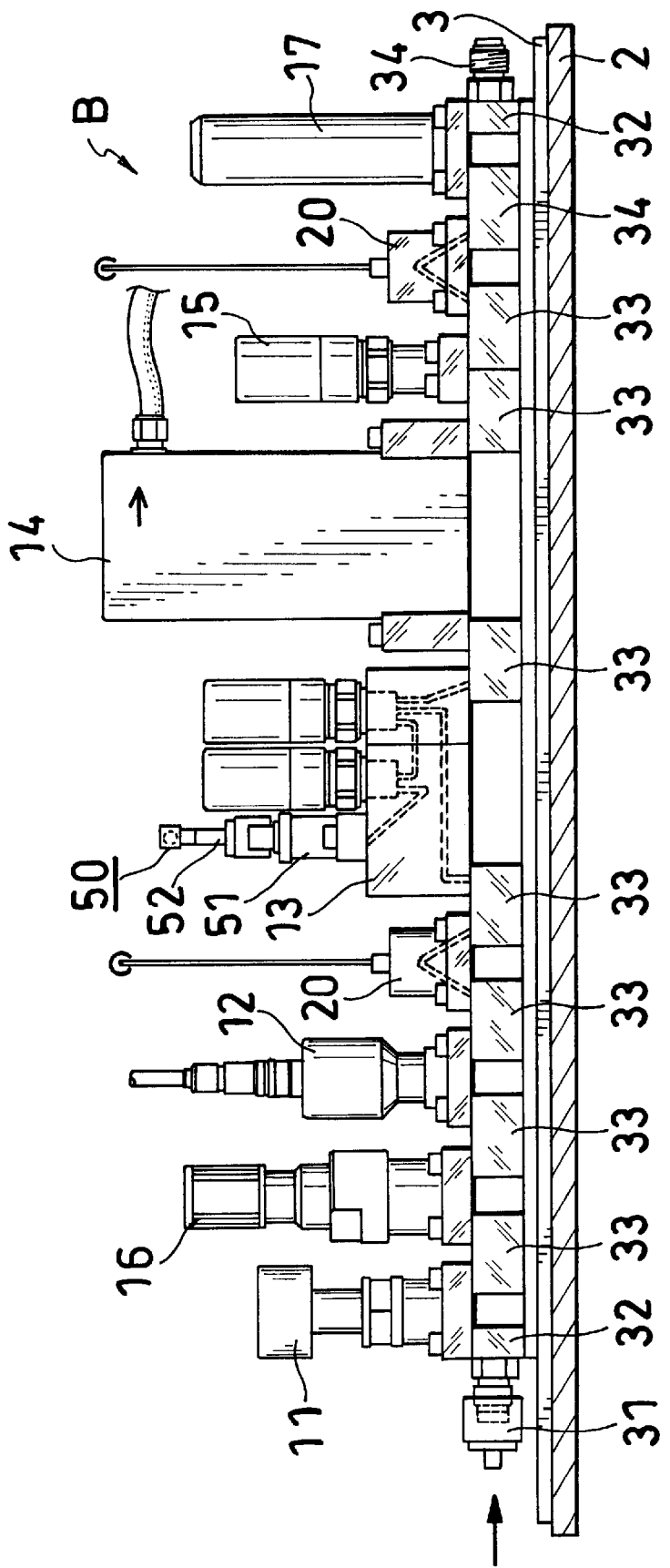
FIG. 4 is a side elevation of B line of FIG. 3.

Arranged as upper members in the process gas B line B shown in FIG. 4 are a check valve 11, pressure regulator 16, pressure sensor 12, inverted V-shaped channel block 20, shutoff-opening device 13, massflow controller 14, on-off valve 15, inverted V-shaped channel block 20 and filter 17.

Further arranged from the left rightward as lower members are an L-shaped channel block coupling 32 connected to the check valve 11 and having an inlet coupling 31 attached thereto, a V-shaped channel block coupling 33 for holding the check valve 11 in communication with the pressure regulator 16, a V-shaped channel block coupling 33 for holding the pressure regulator 16 in communication with the pressure sensor 12, a V-shaped channel block coupling 33 for holding the pressure sensor 12 in communication with the inverted V-shaped channel block 20, a V-shaped channel block coupling 33 for holding the channel block 20 in communication with the shutoff-opening device 13, a V-shaped channel block coupling 33 for holding the shutoff-opening device 13 in communication with the massflow controller 14, a V-shaped channel block coupling 33 for holding the controller 14 in communication with an on-off valve 15, a V-shaped channel block coupling 33 for holding the valve 15 in communication with the inverted V-shaped channel block 20, a V-shaped channel block coupling 33 for holding the block 20 in communication with the filter 17, and an L-shaped channel block coupling 31 connected to the filter 17 and having an outlet coupling 34 attached thereto.

As shown in FIG. 11, the inverted V-shaped channel block 20 has an upward channel 20b for upwardly opening the top portion of an inverted V-shaped channel 20a.

Figure 5:
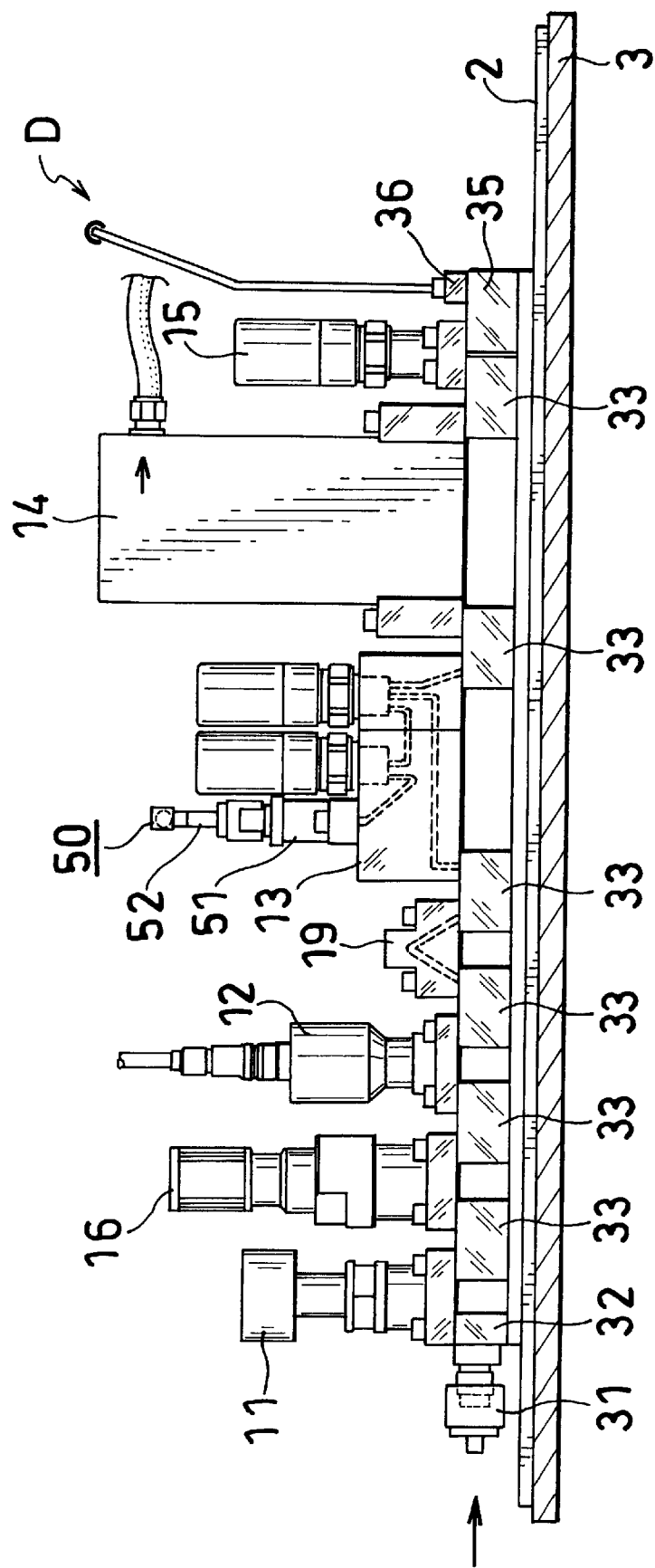
FIG. 5 is a side elevation of D line of FIG. 3.
Figure 6:
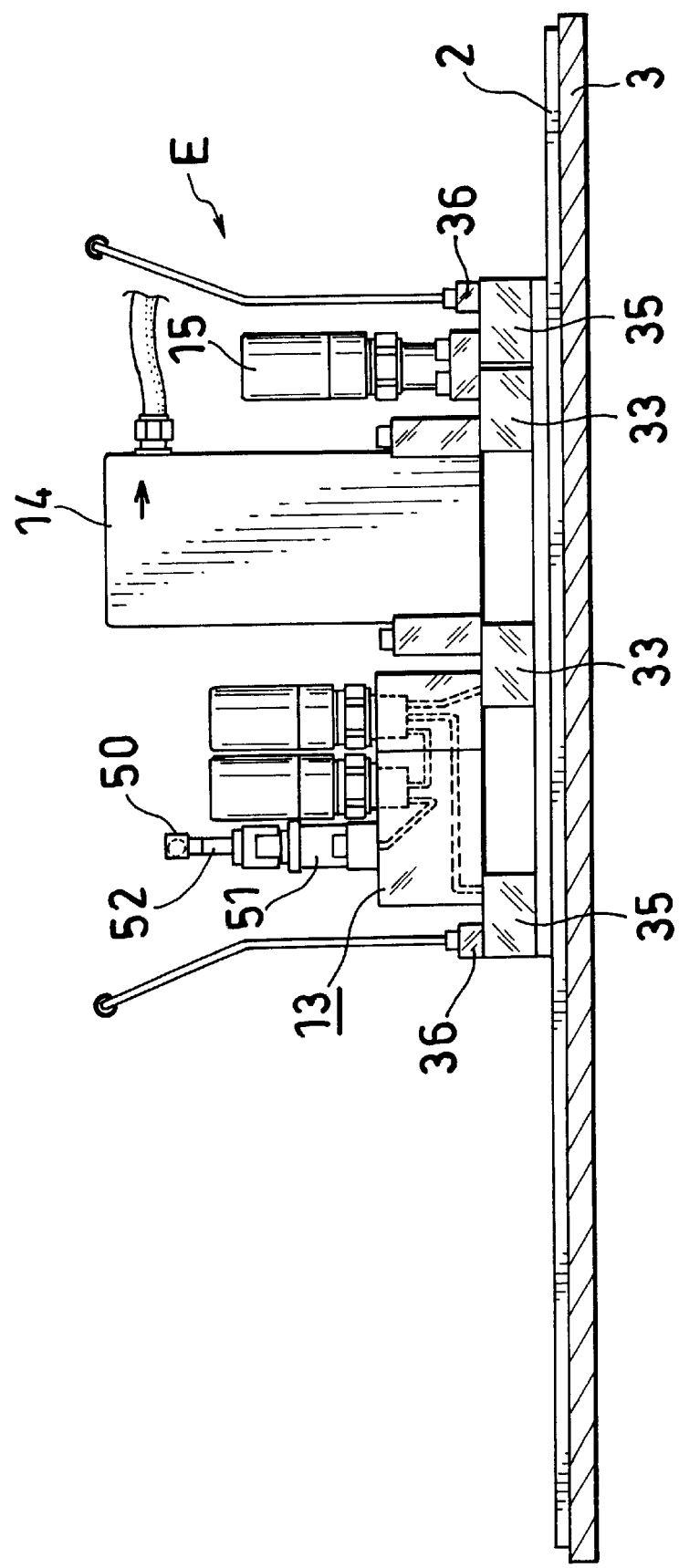
FIG. 6 is a side elevation of E line of FIG. 3.

With reference to the process gas D line D shown in FIG. 5, an outlet coupling 36 has an upward opening and is mounted on the upper surface of a V-shaped channel block coupling 35 connected to the on-off valve 15. Further the process gas E line E shown in FIG. 6 is provided at its inlet and outlet with couplings 35, 36 of the same construction as in the line D shown in FIG. 5.

The outlet coupling 36 of the process gas D line D is connected to the inverted V-shaped channel block 20 of the process gas B line B. The outlet coupling 36 of the process gas E line E is connected to the inverted V-shaped channel block 20 at the outlet side of the process gas C line C. The inlet coupling 36 of the process gas E line E is connected to the inverted V-shaped channel block 20 at the inlet side of the process gas C line C.

The second embodiment shown in FIG. 3 can be obtained from the first embodiment shown in FIG. 1 by removing the channel connecting means 50 interconnecting the shutoff-opening devices 13 first, mounting the process gas D line D and the process gas E line E as attached to the respective subbase panels 3 on the main base panel 2, replacing the inverted V-shaped channel blocks in the process gas B line B and the process gas C line C, finally attaching channel connecting means 53 comprising five I-shaped channel block couplings 51 and tubes 52, and further using tubes for connection as required. The new channel connecting means 53 differs from the original means 53 only in the numbers of I-shaped channel block couplings 51 and tubes 53 and can therefore be prepared and attached easily.

Figure 7:
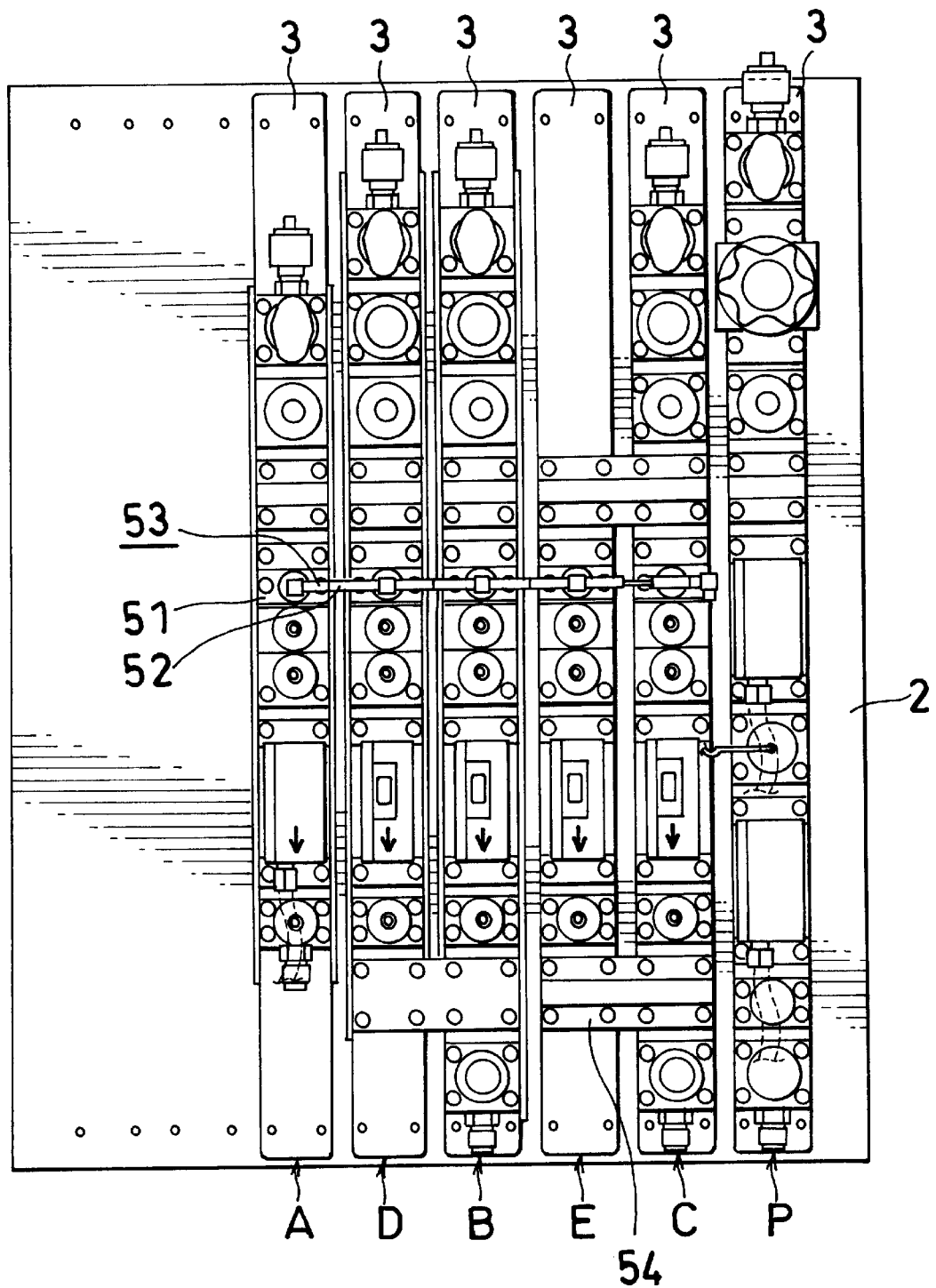
FIG. 7 is a plan view showing a third embodiment of fluid control apparatus of the invention.

FIG. 7 shows a third embodiment of the invention, which is obtained by installing two additional lines in the first embodiment shown in FIG. 1 and which is exactly the same as the second embodiment in function. Unlike the second embodiment, the two lines to be added to the first embodiment are not installed merely at the left of the first embodiment. To render the resulting apparatus easy to use, process gas D line D is additionally installed between the process gas A line A and the process gas B line B, and process gas E line E is additionally provided between the process gas B line B and the process gas C line C. The inverted V-shaped channel blocks 20 provided in the line E and line C of the second embodiment are removed, and a manifold block coupling 53 common to the two lines E, C is provided.

The manifold block coupling 54 has channels 54a inverted V-shaped in section [see FIG. 12(a)] and interconnected at their top portions by a channel 54b extending transversely of the apparatus [see FIG. 12(b)]. The channel 54b has an internally threaded right end portion 55.

The third embodiment shown in FIG. 7 can be obtained from the first embodiment shown in FIG. 1 by removing the channel connecting means 50 interconnecting the shutoff-opening devices 13 first, removing the process gas A line A and the process gas B line B as attached to the respective subbase panels 3 from the main base panel 2, thereafter installing the process gas A line A, process gas B line B, process gas D line D and process gas E line E as attached to the respective subbase panels 3 in position on the main base panel 2, further replacing the inverted V-shaped channel blocks of the line E and line C by the manifold block coupling, and finally attaching channel connecting means 53 comprising five I-shaped channel block couplings 51 and tubes 52. There is no need to use other tubes for connection.

According to the third embodiment, some process gas lines are altered in position, and the manifold block coupling 54 is used, with the result that the tubes are used only for interconnecting the shutoff-opening devices. The apparatus is therefore easy to modify because of diminished weld joints and further has the advantage of being easy to maintain because of simplified piping.

What is claimed is:

1. A fluid control apparatus comprising lines (A), (B), (C), (D), (E), (P) arranged in parallel and each comprising a plurality of lower members (31), (32), (33), (34) arranged in series and a plurality of upper members (11), (12), (13), (14), (15), (16), (17), (18), (19) arranged in series, channels of members of adjacent lines (A), (B), (C), (D), (E), (P) being interconnected by channel connecting means (50), (53), (54) at specified locations, the fluid control apparatus being characterized in that the lower members (31), (32), (33), (34) of each of the lines (A), (B), (C), (D), (E), (P) are mounted on a subbase panel (3) with screws, the upper members (11), (12), (13), (14), (15), (16), (17), (18), (19) of each line being mounted on the lower members (31), (32), (33), (34) with screws, the subbase panels (3) being mounted on a single main base panel (2).

2. A fluid control apparatus according to claim 1 wherein the main base panel (2) has a space for installing additional lines.

3. A fluid control apparatus according to claim 1, wherein the channel connecting means (50), (53), (54) is removable upward.

4. A fluid control apparatus according to claim 1 wherein one of the uper members (11), (12), (13), (14), (15), (16), (17), (18), (19) is a shutoff-opening device (13) comprising a two-port valve (61) and a three-port valve (62) which are arranged adjacent to each other.

5. A fluid control apparatus according to claim 4 wherein the two-port valve (61) comprises a valve body (63) having a first fluid inflow channel (65) and a first fluid outflow channel (66), and an actuator (64) for bringing the two channels (65), (66) into or out of communication with each other, and the three-port valve (62) comprises a valve body (68) having a first fluid inflow channel (70), a second fluid channel (71) and an outflow channel (72) for use with a first fluid and a second fluid in common, and an actuator (69) for bringing the second fluid inflow channel (71) into or out of communication with the outflow channel (72), the first fluid inflow channel (70) of the three-port valve (62) always communicating with the outflow channel (72) thereof via a valve chamber (76), the first and second fluid inflow channels (70), (71) of the three-pot valve (62) being opened in an abutting surface, the outflow channel (72) of the three-port valve (62) being opened in a lower surface, the first fluid outflow channel (66) of the two-port valve (61) being in communication with the first fluid inflow channel (70) of the three-port valve (62), the valve body (63) of the two-port valve (61) being further provided with a second fluid inflow channel (67) opened in a lower surface thereof and communicating with the second fluid inflow channel (71) of the three-port valve (62).

6. A fluid control apparatus according to claim 5 wherein the first fluid inflow channel (65) of the two-port valve (61) comprises an upstream portion (65*a*) opened in an upper surface of the valve body (63) and extending obliquely downward from the upper surface of the valve body (63), and a downstream portion (65*b*) communicating with the upstream portion (65*a*) and extending upward to a valve chamber (73) of the two-port valve (61), the first fluid inflow channels (65) of the adjacent lines (A), (B), (C), (D). (E), (P) being connected to one another by the channel connecting means (50), (53), (54).

7. A fluid control apparatus according to claim 1 wherein the channel connecting means (50), (53) comprise a block coupling (51) mounted in place with screws driven in from above and having an I-shaped channel (83).

8. A fluid control apparatus comprising lines (A), (B), (C), (D), (E), (P) arranged in parallel and each comprising a plurality of lower members (31), (32), (33), (34) arranged in series and a plurality of upper members (11), (12), (13), (14), (15), (16), (17), (18), (19) arranged in series, channels of members of adjacent lines (A), (B), (C), (D), (E), (P) being interconnected by channel connecting means (50), (53), (54) at specified locations, the fluid control apparatus being characterized in that the lower members (31), (32), (33), (34) of each of the lines (A), (B), (C), (D), (E), (P) are mounted on a subbase panel (3) with screws, the upper members (11), (12), (13), (14), (15), (16), (17), (18), (19) of each line being mounted on the lower members (31), (32), (33), (34) with screws, the subbase panels (3) being mounted on a single main base panel (2), the channel connecting means (50), (53), (54) being removable upward, wherein one of the upper members (11), (12), (13), (14), (15), (16), (17), (18), (19) is a shutoff-opening device (13) comprising a two-port valve (61) and a three-port valve (62) which are arranged adjacent to each other.

9. A fluid control apparatus according to claim 8 wherein the two-port valve (61) comprises a valve body (63) having a first fluid inflow channel (65) and a first fluid outflow channel (66), and an actuator (64) for bringing the two channels (65), (66) into or out of communication with each other, and the three-port valve (62) comprises a valve body (68) having a first fluid inflow channel (70), a second fluid inflow channel (71) and an outflow channel (72) for use with a first fluid and a second fluid in common, and an actuator (69) for bringing the second fluid inflow channel (71) into or out of communication with the outflow channel (72), the first fluid inflow channel (70) of the three-port valve (62) always communicating with the outflow channel (72) thereof via a valve chamber (76), the first and second fluid inflow channels (70), (71) of the three-port valve (62) being opened in an abutting surface, the outflow channel (72) of the three-port valve (62) being opened in a lower surface, the first fluid outflow channel (66) of the two-port valve (61) being in communication with the first fluid inflow channel (70) of the three-port valve (62), the valve body (63) of the two-port valve (61) being further provided with a second fluid inflow channel (67) opened in a lower surface thereof and communicating with the second fluid inflow channel (71) of the three-port valve (62).

10. A fluid control apparatus according to claim 9 wherein the first fluid inflow channel (65) of the two-port valve (61) comprises an upstream portion (65*a*) opened in an upper surface of the valve body (63) and extending obliquely downward from the upper surface of the valve body (63), and a downstream portion (65*b*) communicating with the upstream portion (65*a*) and extending upward to a valve chamber (73) of the two-port valve (61), the first fluid inflow channels (65) of the adjacent lines (A), (B), (C), (D), (E), (P) being connected to one another by the channel connecting means (50), (53), (54).

11. A fluid control apparatus comprising lines (a), (B), (C), (D), (E), (P) arranged in parallel and each comprising a plurality of lower members (31), (32), (33), (34) arranged in series and a plurality of upper members (11), (12), (13), (14), (15), (16), (17), (18), (19) arranged in series, channels of members of adjacent lines (A), (B), (C), (D), (E), (P) being interconnected by channel eonnecting means (50), (53), (54) at specified locations the fluid control apparatus being characterized in that the lower members (31), (32), (33), (34) of each of the lines (A), (B), (C), (D), (E), (P) are mounted on a subbase panel (3) with screws, the upper members (11), (12), (13), (14), (15), (16), (17), (18), (19) of each line being mounted on the lower members (31),(32), (33), (34) with screws, the subbase panels (3) being mounted on a single main base panel (2), the channel connecting means (50), (53), (54) being removable upward, wherein the channel connecting means (50), (53) comprise a block coupling (51) mounted in place with screws driven in from above and having an I-shaped channel (83).

12. A fluid control apparatus according to claim 1 wherein the channel connecting means (54) comprises a manifold block coupling mounted in place with screws driven in from above and having a lateral opening.

\* \* \* \* \*